(12) United States Patent
Dotan

(10) Patent No.: US 6,382,085 B1
(45) Date of Patent: May 7, 2002

(54) COOKING APPLIANCE PARTICULARLY USEFUL AS A MULTI-FUNCTION TOASTER OVEN

(75) Inventor: Simon Dotan, Natania (IL)

(73) Assignee: Home Care Technologies Ltd., Tel-Aviv (IL)

( * ) Notice: Subject to any disclaimer, the term of this patent is extended or adjusted under 35 U.S.C. 154(b) by 0 days.

(21) Appl. No.: 09/753,691

(22) Filed: Jan. 4, 2001

(51) Int. Cl.[7] .............................. A47J 37/00; A47J 37/04
(52) U.S. Cl. .................. 99/331; 99/421 H; 99/421 HH; 99/419; 99/339; 99/340
(58) Field of Search .......................... 99/339, 340, 389, 99/390, 391, 401, 419, 421 H, 421 HH, 331; 219/396, 398, 405, 411

(56) References Cited

U.S. PATENT DOCUMENTS

| | | | | |
|---|---|---|---|---|
| 3,194,148 A | * | 7/1965 | Schibley | 99/421 HH |
| 3,848,522 A | * | 11/1974 | Trelc | 99/421 H |
| 4,065,659 A | * | 12/1977 | Yount et al. | 219/398 |
| 4,302,661 A | * | 11/1981 | Perry, Jr. | 219/398 |
| 4,409,452 A | * | 10/1983 | Oouchi et al. | 99/421 H |
| 4,476,848 A | * | 10/1984 | Protas | 99/340 X |
| 6,114,663 A | * | 9/2000 | Stockley | 219/398 |
| 6,199,473 B1 | * | 3/2001 | Dotan et al. | 99/419 X |

\* cited by examiner

Primary Examiner—Reginald L. Alexander
(74) Attorney, Agent, or Firm—G.E. Ehrlich Ltd.

(57) ABSTRACT

A cooking appliance particularly useful as a multi-function toaster oven includes an impaling member in its cooking compartment for impaling a food article to be grilled, and horizontally-extending electrical heaters above and below the impaling member, which electrical heaters are sequentially energized and de-energized according to a predetermined sequence to produce a rotating heat front for heating the food article on the impaling member. The appliance may also include shelf supports for removably supporting one or more wire-screen shelves to enable the appliance also to be used as a toaster oven, a broiler oven, and/or a microwave heater to enable the appliance also to be used as a microwave oven.

18 Claims, 6 Drawing Sheets

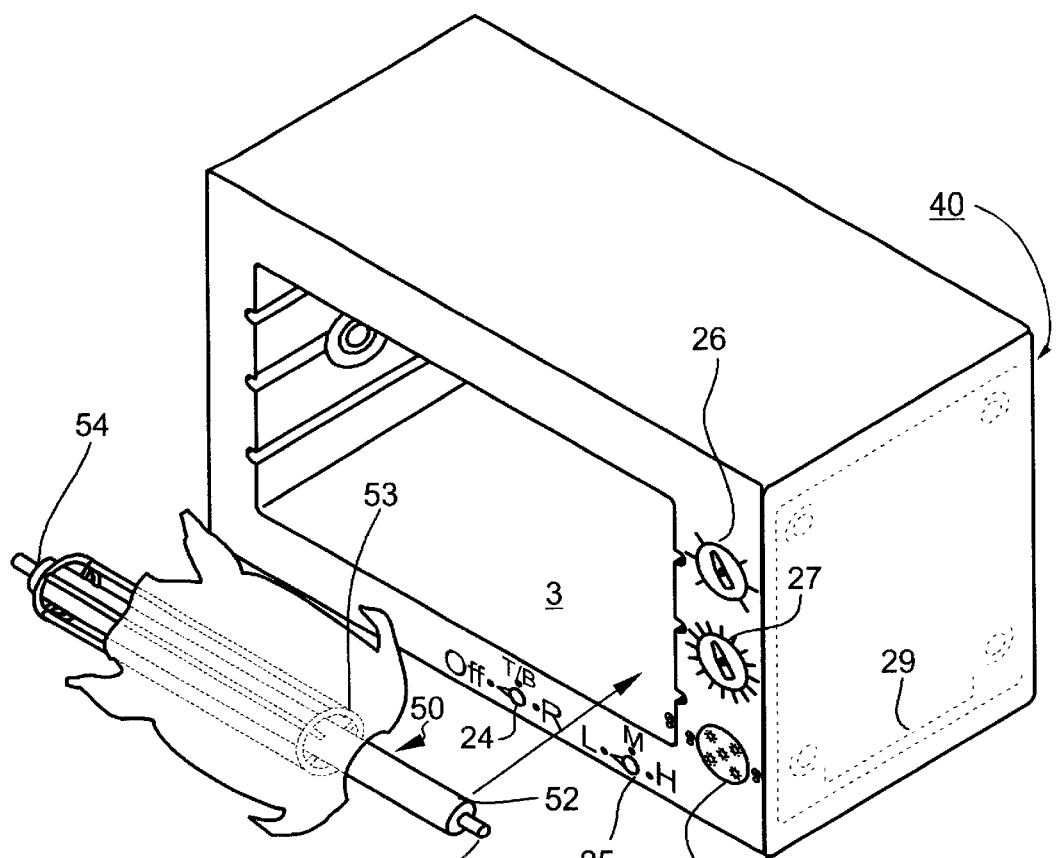
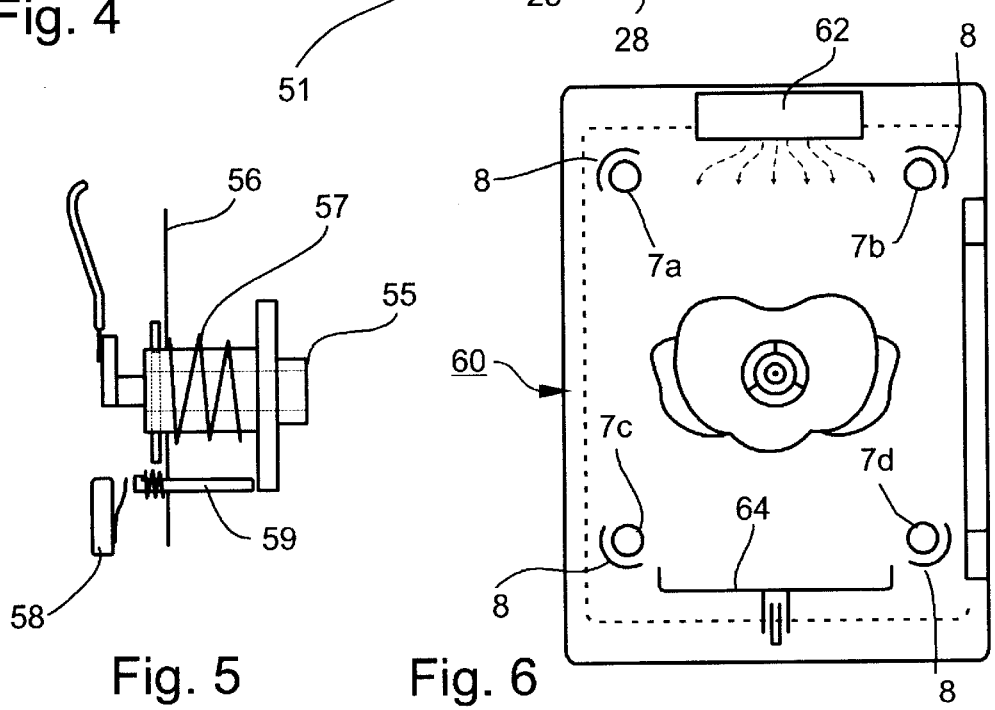
Fig. 4
Fig. 5   Fig. 6

COOKING APPLIANCE PARTICULARLY USEFUL AS A MULTI-FUNCTION TOASTER OVEN

FIELD AND BACKGROUND OF THE INVENTION

The present invention relates to cooking appliances, and particularly to a cooking appliance which may be used as a toaster oven for toasting bread, or as a broiler oven for broiling food articles, as well as a rotisserie for grilling food articles.

Various types of electrical cooking appliances for grilling food articles are known. My prior U.S. Pat. No. 5,907,994, for example, discloses a grilling appliance which includes a vertically-extending impaling member for receiving the article to be grilled, and a circular array of electrical heaters surrounding the impaling member and sequential energized and de-energized according to a predetermined sequence to produce a rotating heat front for heating the food article on the impaling member. The appliance described in that patent, as well as in most other patents relating to grilling appliances, are generally single-function appliances, namely appliances which can only be used for the grilling function.

OBJECTS AND BRIEF SUMMARY OF THE INVENTION

An object of the present invention is to provide a cooking appliance which can be used not only for grilling food articles, but also for other cooking functions, particularly for toasting bread, for broiling food, and/or for micro-heating food.

BRIEF SUMMARY OF THE PRESENT INVENTION

According to one aspect of the present invention, there is provided a cooking appliance, comprising: a housing having walls defining a cooking compartment for receiving a food article to be cooked; a plurality of electrical heaters within the compartment for feeding a food article therein; and an impaling member mounted within the compartment for impaling a food article to be cooked or grilled, and including a further electrical heater for heating the food article impaled thereon; and an electrical supply for energizing and de-energizing the electrical heaters. The impaling member is removably mounted in a horizontal, operative position within the compartment. The appliance further comprises an electrical device effective to permit energization of the further electrical heater within the impaling member only when the impaling member is mounted in the horizontal operative position within the compartment.

As will be described more particularly below, such a cooking appliance can be used as a rotisserie for grilling food articles, but can also be used for other cooking functions, particularly as a toaster oven for toasting bread, for broiling food, and/or as a microwave oven for heating food by microwave heating.

According to another aspect of the present invention, there is provided a cooking appliance, comprising: a housing having walls defining a cooking compartment for receiving a food article to be cooked; an impaling member horizontally mounted within the compartment for impaling a food article to be cooked or grilled; a plurality of electrical heaters within the compartment, including at least one electrical heater extending horizontally over the impaling member, and at least one electrical heater extending horizontally under the impaling member; and an electrical supply for energizing and de-energizing the electrical heaters. The impaling member is pivotally mounted within the compartment about a vertical axis to an operative position disposed completely within the compartment, or to a loading/unloading position projecting outwardly of the compartment to facilitate loading and unloading of a food article with respect to the impaling member.

In the preferred embodiments of the invention described below, the electrical supply energizes and de-energizes the electrical heaters according to a predetermined sequence to produce a rotating heat front for heating the food article on the impaling member.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a perspective view illustrating a second form of cooking appliance constructed in accordance with the present invention;

FIG. 5 is a fragmentary view illustrating the manner of energizing the electrical heater within the impaling member in the cooking appliance of FIG. 4;

FIG. 6 is an end view illustrating a further cooking appliance constructed in accordance with the present invention.

DESCRIPTION OF PREFERRED EMBODIMENTS

Figure 1:
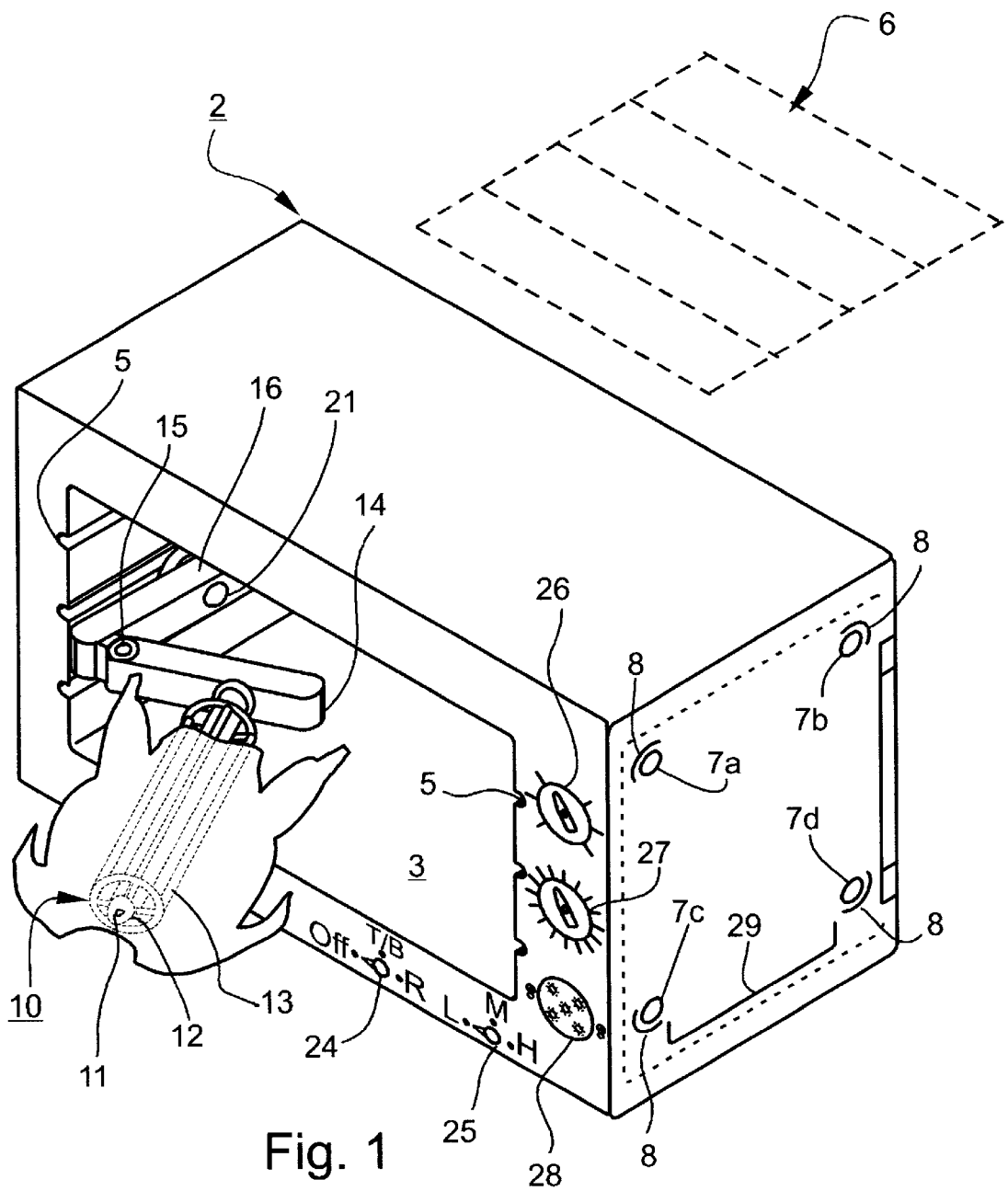
FIG. 1 is a perspective view illustrating one form of cooking appliance constructed in accordance with the present invention.
Figure 2:
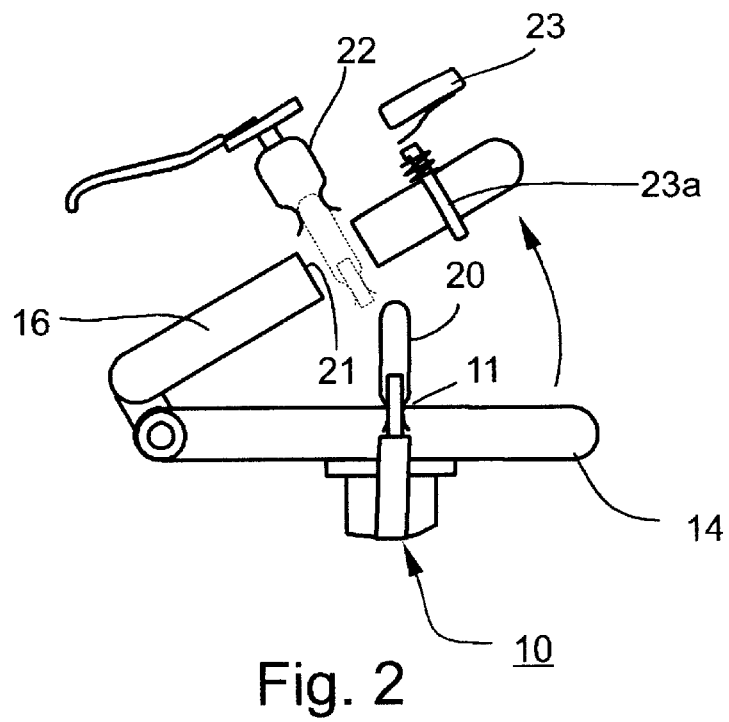
FIG. 2 is a fragmentary view illustrating the manner of energizing the electrical heater within the impaling member in the cooking appliance of FIG. 1.
Figure 3:
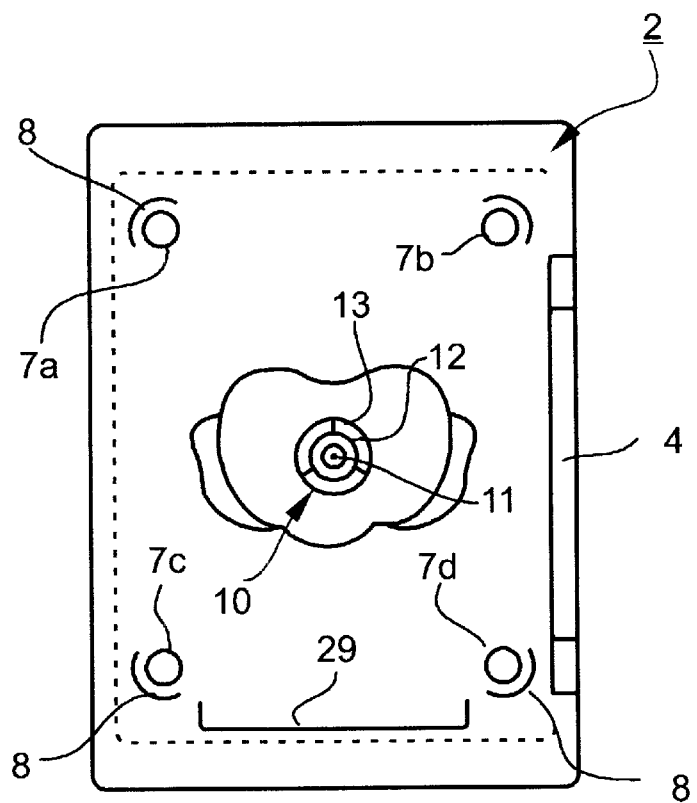
FIG. 3 is an end view illustrating the cooking appliance of FIG. 1.

The cooking appliance in FIGS. 1–3 illustrates the invention implemented in a multi-function toaster oven, namely an oven for toasting bread, and/or for broiling food, but which is also capable of serving as a rotisserie for grilling food articles.

The illustrated cooking appliance includes a housing, generally designated 2, defining an internal cooking compartment 3 closed at the front side by a front door 4 (FIG. 3) pivotal to an open or closed position to provide access into the internal compartment 3, as in a conventional toaster oven. The side walls of the housing 2 are formed on the inner surfaces, facing the internal compartment 3, with a plurality of parallel recesses 5 for removably mounting one or more wire screen shelves 6, one of which is shown in FIG. 1. The food article within compartment 3 is heated by a plurality of horizontally-extending heaters 7a–7d mounted in the top and bottom of the housing 2, with each heater including a reflector 8 for reflecting the heat inwardly of the compartment 3.

To enable the illustrated cooking appliance also to be used as a rotisserie, it is provided with an impaling member 10 for impaling a food article to be grilled within the cooking compartment 3. Impaling member 10 is removably mounted within compartment 3 in a quick and convenient manner so that the impaling member can be quickly applied when the appliance is to be used as a rotisserie for grilling a food article, and quickly removed when the appliance is to be used as a toaster oven for toasting bread, or the like, supported on the wire-screen shelves 6 received within the compartment 3 instead of the impaling member.

Impaling member 10 includes an inner heating element 11 enclosed within a metal tube 12, and an outer wire-cage 13 which serves to space a major part of the surface area of the food article on the impaling member from the metal tube 12 of the electrical heater 11. Such a construction has been found to better distribute the heat from the central heater 11 to the food article surfaces, and particularly to avoid charring or smoking the food articles, which otherwise could occur especially since the food is supported in a horizontal position with its weight pressing it directly against the impaling member, rather than in a vertical position as in a conventional rotisserie.

The impaling member 10 is mounted to the appliance 2 in a manner which enables it to be quickly removed for converting the appliance to a toaster oven, and also enables the food article to be conveniently loaded thereon and unloaded therefrom. For this purpose, the impaling member 10 is carried by a bracket arm 14 pivotally mountable by a vertical pin 15 to a bracket 16 fixed to the side wall of the appliance housing 2. Pin 15 may be provided with an enlarged head (not shown) to facilitate its application and removal in order to allow bracket 14, with the impaling member 10 carried thereby, to be quickly removed from the appliance, or to be quickly attached to the appliance. Pin 15 also serves as a vertical pivot for bracket 14 and the impaling member 10 carried thereby, to enable the impaling member and the food article thereon to be pivoted to an operative position disposed completely within compartment 3, or to a loading/unloading position projecting outwardly of the compartment, as shown in FIG. 1.

The electrical heater 11 within the impaling member 10 can be energized only when bracket 14, with the impaling member has been applied and has been pivoted to its operative position within compartment 3. For this purpose, the central electrical heater 11 carried by the impaling member 10 is provided with a contact pin 20, passing through the pivotal bracket 14 so as to face the fixed bracket 16. When bracket 14 is pivoted to the operative position of the impaling member 10 (i.e., parallel to the fixed bracket 16 so that the impaling member 10 and the food article thereon are wholly within compartment 3), contact pin 20 passes through an opening 21 in the fixed bracket 16 and is received within an electrical socket 22 connected to the power supply for energizing the center electrical heater 11. The actual energization of the electrical heater 11, however, is controlled by a microswitch 23 which is actuated to its on-position by an actuator 23a when bracket 14 is pivoted against the fixed bracket 16, i.e., when the impaling member 10, with the food article carried thereby has been moved to the operative position within compartment 3.

The appliance includes a number of presettable controls for controlling the electrical heaters 7a–7d within the heating compartment 3, well as electrical heater 11 within the impaling member 10 As described more particularly below, the four electrical heaters 7a–7d within the heating compartment 3 are sequentially energized and de-energized to produce a rotating heat front for heating the food article on the impaling member 10, whereas electrical heater 11 within the impaling member is continuously energized for continuously heating the interior of the food article impaled on that member.

The presettable controls include an on-off and T/B-R selector knob 24, which turns-on all the electrical heaters and also selects the toaster/broiler(T/B) or the rotisserie (R) mode of operation. For the toaster broiler mode, switch 23 must be open, indicating that the impaling member 10 has not been applied; instead, the heating compartment 3 would include one or more shelves 6 for toasting bread or for broiling, e.g., meat. If the rotisserie mode is selected, switch 23 must be closed by the pivotal bracket 14 of the impaling member 10.

Figure 7A:
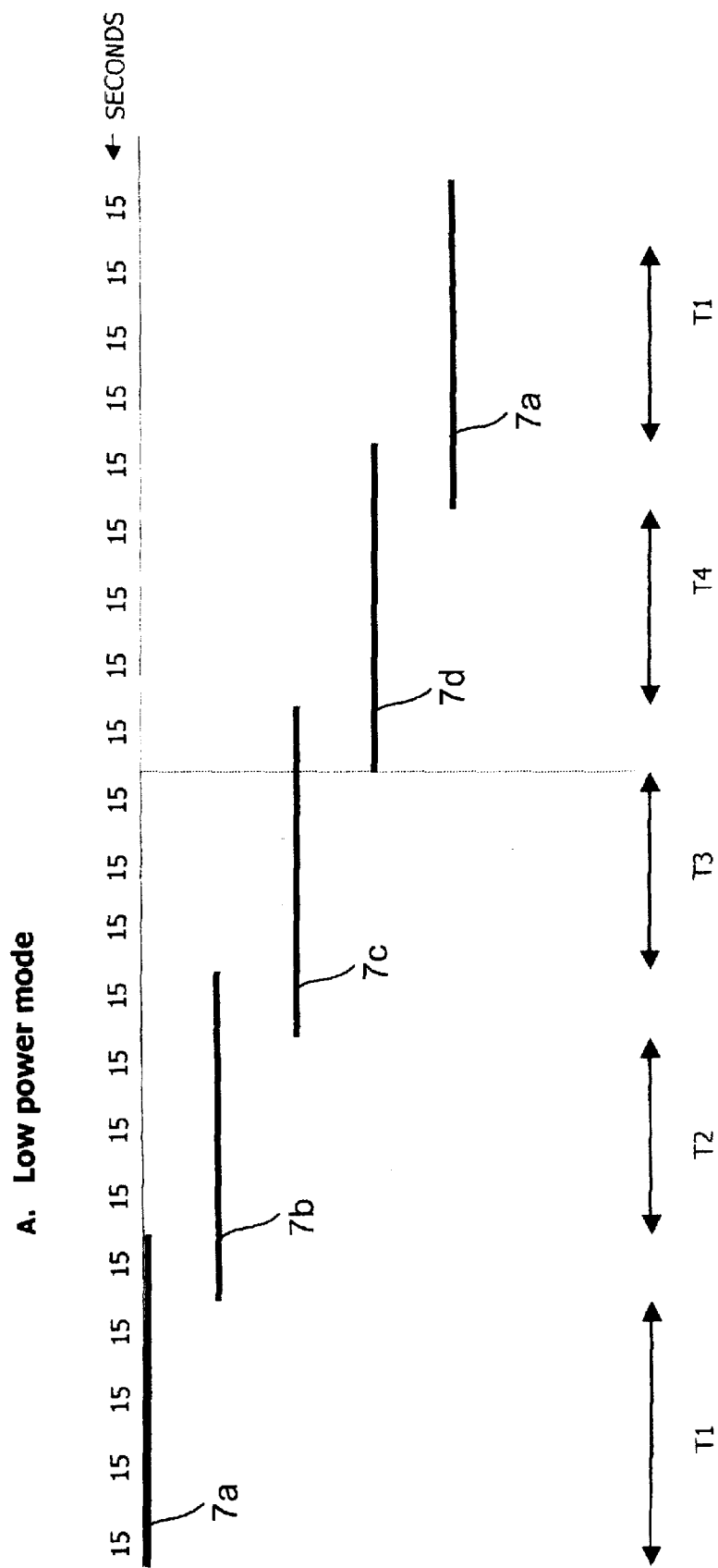
FIGS. 7a–7c are timing diagrams illustrating an example of the sequences of operation of the electrical heaters in the described preferred embodiments during Low, Medium and High Modes of operation.
Figure 7B:
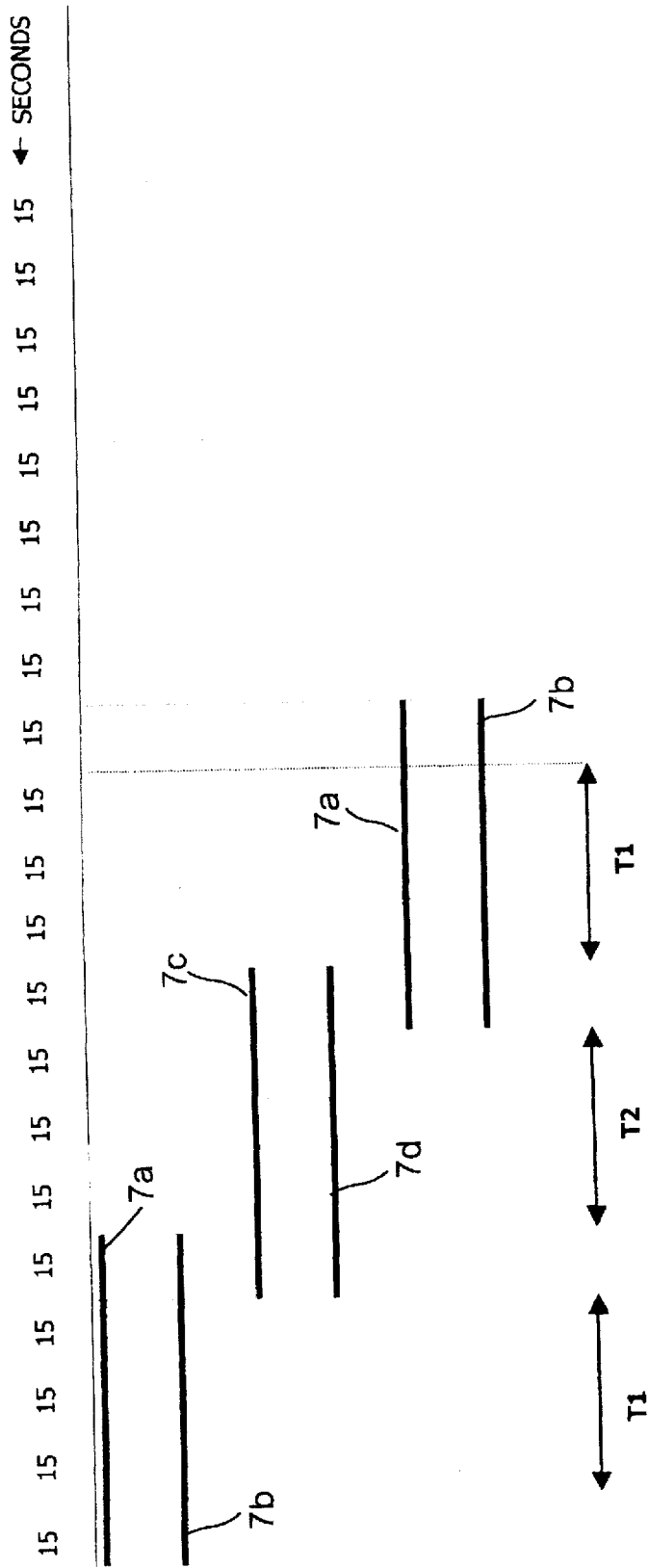
Figure 7C:
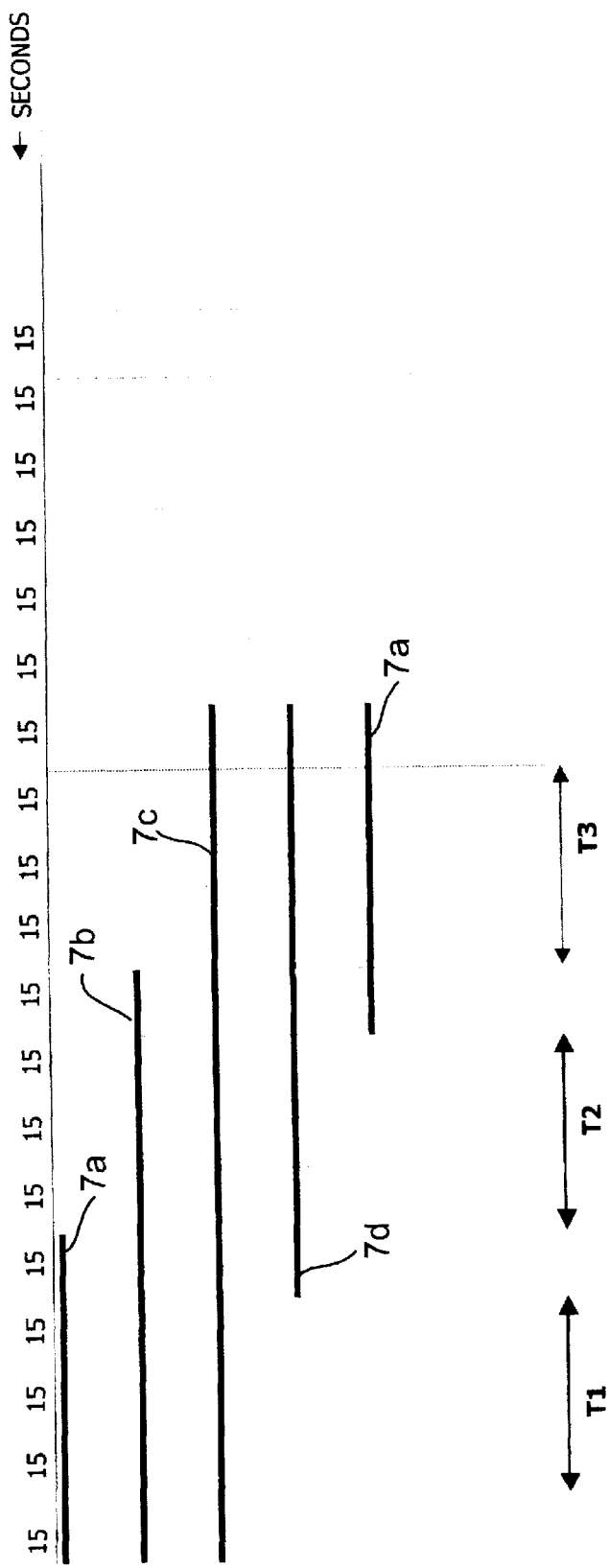

The presettable controls further include a selector knob 25 which presets the heat intensity to either "low", "medium" or "high", as will be described more particularly below with respect to FIGS. 7a–7c; a temperature control knob 26 which presets the temperature within compartment 3, and a timer control knob 27 which presets the time of energization of the electrical heaters.

The illustrated appliance also includes a group of light indicators 28, such as LEDs, to indicate the status of the electrical heaters in the appliance. Thus, there would be five LEDs in the light indicators 28, the upper two for indicating the energization status of the two upper heaters 7a, 7b in compartment 3, the two lower ones for indicating the status of the two lower heaters 7c, 7d in compartment 3, and a central LED for indicating the status of the central heater 11 within the impaling member 10.

A removable pan 29 (FIGS. 1, 3) is provided at the bottom of the heating compartment 3 for catching drippings when the appliance is used as a rotisserie with the impaling member 10, or for catching crumbs when the appliance is used as a toaster oven with the shelves 6.

The appliance illustrated in FIGS. 1–3 may be used in the following manner.

When the appliance is to be used as a toaster/broiler oven, the impaling member 10 is removed, by withdrawing pin 15 and removing the impaling member with its bracket 14 from the fixed bracket 16 in the heating compartment 3. The wire-screen shelves 6 would then be inserted into the grooves 5, to support the bread slices for toasting, or the food article (e.g., meat) for broiling, by two, or all four, of the heaters 7a–7d, which would be energized.

When it is desired to use the appliance as a rotisserie, the wire shelves 6 would be removed, and the impaling member 10 would be applied by pivotally mounting its bracket 14 to the fixed bracket 16 by means of pin 15. The food article to be grilled could be applied to the impaling member 10 before that member is attached by pin 15 to the appliance. Alternatively, the impaling member, with its bracket 14, could be applied by pin 15 to the appliance, pivoted to its loading/unloading position as shown in FIG. 1 for loading the article to be grilled, and then pivoted about pin 15 to the operative or grilling position of the impaling member wholly within the compartment 3.

When the impaling member 10, with or without its food article, is pivoted to be wholly within the grilling compartment 3, the contact pin 20 at the end of the electrical heater 11 of the impaling member 10 passes through opening 21 in the fixed bracket 16 and is received in the electrical socket 22 to provide electrical current to the central heater 11. The actual control of the electrical current, however, is by the microswitch 23 which is closed by its operator 23a when the pivotal bracket 14 of the impaling member 10 has been pivoted to the operative position of the impaling member, against the fixed bracket 16 within the compartment 3.

Selector 24 is then set to the "R" (rotisserie) mode; selector 25 is preset according to the heating intensity desired (low, medium, high,); selector 26 is preset to the desired temperature; and selector 27 is preset according to the desired time of operation of the rotisserie.

When selector 24 is set to the "R", (rotisserie) mode, the heating elements 7a–7d are sequentially energized and de-energized to produce a rotating heat front around the impaling member 10 and the article carried by it. Heat-intensity knob 25 presets the heat intensity to "low" "medium" or "high". FIGS. 7a–7c illustrate examples of sequences of energizing the heating elements 7a–7d according to the heat-intensity Mode selected.

While FIG. 7 illustrates how the heat intensities can be varied by varying the sequence and period of energization and de-energization of the electrical heaters 7a–7d, it will be appreciated that the heat intensity can also be varied by varying the intensity of energization of each electrical heater, i.e., by varying the amount of electrical current passed through the respective electrical heaters 7a–7d.

In the toaster or broiler mode, all (or a part of) the electrical heaters would be continuously energized during the heating period.

The timer selector 27 selects the complete heating time so that the appliance will be automatically turned-off at the end of the selected time period.

The LED assembly 28 indicates the energization status of each of the electrical heaters 7a–7d and 11, and therefore will indicate the speed of rotation of the heat front.

FIGS. 4 and 5 illustrate an appliance, therein generally designated 40, which is substantially the same as described above with respect to FIGS. 1–3, and therefore to facilitate understanding, the corresponding parts have been identified with the same reference numerals. The main difference in the appliance 40 illustrated in FIGS. 4 and 5, over that illustrated in FIGS. 1–3, is the manner in which the impaling member, generally designated 50 in FIGS. 4 and 5, is mounted within the heating compartment 3 of the appliance.

As shown in FIG. 4, impaling member 50 includes a central electrical heater 51, a metal tube 52 thereover, and a tubular wire cage 53 over the metal tube 52 for receiving the food article to be grilled, as impaling member 10 illustrated in FIGS. 1–3. One end of impaling member 50 is also provided with a contact pin 54 for making electrical connection to the electrical heater 51. Contact pin 54 is receivable within a socket 55 spring-mounted by spring 57 in the compartment wall 56. When that end of the impaling member is so mounted, socket 55 actuates a micro-switch 58 via an actuator 59 to enable the electrical heater 51 to be energized.

The opposite end of impaling member 50 may be free, or may be similarly constructed and mounted in the opposite wall of the heating compartment 3. In the latter case, both ends may be retained in their respective sockets by a pin-and-bayonet connection, similar to that provided in standard fluorescent-light fixtures. Thus, the food article to be grilled may be first mounted on the impaling member 50, and then the impaling member, with the food article thereon, may be manually inserted into the heating compartment 3 in alignment with the two sockets at the opposite ends, and slightly rotated to make the pin-end-bayonet connection for retaining the impaling member with the food article to be grilled within the heating compartment 3.

In all other respects, the structure and mode of operation of the appliance illustrated in FIGS. 4 and 5 may be the same as described above with respect to FIGS. 1–3.

FIG. 6 illustrates another modification that may be included in the appliance, therein designated 60. In this modification, the appliance includes a microwave generator 62 at the upper end of the heating chamber 3, and a rotating table 64 at the lower end, so as to enable the appliance also to be used as a microwave oven.

While the invention has been described with respect to several preferred embodiments, it will be appreciated that these are set forth merely for purposes of example, and that many other variations, modifications and applications of the invention may be made.

What is claimed is:

1. A cooking appliance comprising:
    a housing having walls defining a cooking compartment for receiving a food article to be cooked;
    a plurality of electrical heaters within said compartment for heating a food article therein;
    an impaling member mounted within said compartment for impaling a food article to be cooked or grilled, and including a further electrical heater for heating the food article impaled thereon;
    and an electrical supply for energizing and de-energizing said electrical heaters;
    said impaling member being removably mounted in a horizontal, operative position within said compartment;
    said appliance further comprising an electrical device effective to permit energization of said further electrical heater within said impaling member only when the impaling member is mounted in said horizontal operative position within said compartment.

2. The appliance according to claim 1, wherein said impaling member is pivotally mounted within said compartment about a vertical axis to an operative position disposed completely within said compartment, or to a loading/unloading position projecting outwardly of said compartment to facilitate loading and unloading of a food article with respect to the impaling member;
    said electrical device being an electrical swatch which is actuated to permit energization of said further electrical heater when said impaling member is pivoted to its operative position disposed completely within said compartment.

3. The appliance according to claim 1, wherein said impaling member includes a bracket arm which is removably mounted within said compartment by a removable pin.

4. The appliance according to claim 3, wherein said removable pin extends vertically, and also serves as a pivotal mounting for said impaling member, permitting the impaling member to be pivoted to an operative position disposed completely within said compartment, or to a loading/unloading position projecting outwardly of said compartment to facilitate loading and unloading of a food article with respect to said impaling member.

5. The appliance according to claim 1, wherein said impaling member is removably mounted within said compartment by a socket in at least one of the walls of said housing.

6. The appliance according to claim 1, wherein said impaling member includes an outer tubular wire cage enclosing said further electrical heater to space the major part of the surface area of the food article, when on said impaling member, from said further electrical heater.

7. The appliance according to claim 6, wherein said impaling member further includes a metal tube enclosing said electrical heater and mounted coaxially within said outer tubular wire cage in radially spaced relationship thereto.

8. The appliance according to claim 1, wherein said walls of the housing include shelf supports for supporting one or more wire-screen shelves in said compartment to enable the appliance also to be used as a toaster oven.

9. The appliance according to claim 1, wherein said plurality of electrical heaters in said compartment include at least two spaced electrical heaters extending horizontally over said impaling member, and at least two spaced electrical heaters extending horizontally under said impaling member.

10. The appliance according to claim 9, wherein said electrical supply energizes and de-energizes said electrical heaters according to a predetermined sequence to produce a rotating heat front for heating a food article impaled on said impaling member.

11. A cooking appliance, comprising:

a housing having walls defining a cooking compartment for receiving a food article to be cooked;

an impaling member horizontally mounted within said compartment for impaling a food article to be cooked or grilled;

a plurality of electrical heaters within said compartment, including at least one electrical heater extending horizontally over said impaling member, and at least one electrical heater extending horizontally under said impaling member;

and an electrical supply for energizing and de-energizing said electrical heaters;

said impaling member being pivotally mounted within said compartment about a vertical axis to an operative position disposed completely within said compartment, or to a loading/unloading position projecting outwardly of said compartment to facilitate loading and unloading of a food article with respect to the impaling member.

12. The appliance according to claim 11, wherein said plurality of electrical heaters in said compartment include at least two spaced electrical heaters extending horizontally over said impaling member, and at least two spaced electrical heaters extending horizontally under said impaling member.

13. The appliance according to claim 12, wherein said electrical supply energizes and de-energizes said electrical heaters according to a predetermined sequence to produce a rotating heat front for heating a food article impaled on said impaling member.

14. The appliance according to claim 11, wherein said impaling member includes a further electrical heater controlled by an electrical switch which is actuated to permit energization of said further electrical heater only when the impaling member is pivoted to said operative position disposed completely within said compartment.

15. The appliance according to claim 11, wherein said impaling member is removably mounted within said compartment by a removable pivot pin.

16. The appliance according to claim 11, wherein said walls of the housing include shelf supports for supporting one or more wire-screen shelves in said compartment to enable the appliance also to be used as a toaster oven.

17. The appliance according to claim 11, wherein said impaling member includes an outer tubular wire cage enclosing said further electrical heater to space the major part of the surface area of the food article, when on said impaling member, from said further electrical heater.

18. The appliance according to claim 17, wherein said impaling member further includes a metal tube enclosing said electrical heater and mounted coaxially within said outer tubular wire cage in radially spaced relationship thereto.

* * * * *